United States Patent
Le Moal

(10) Patent No.: US 8,608,613 B2
(45) Date of Patent: Dec. 17, 2013

(54) DOUBLE-FLYWHEEL DAMPER WITH EPICYCLIC GEAR TRAIN

(71) Applicant: Patrick Le Moal, Amiens (FR)

(72) Inventor: Patrick Le Moal, Amiens (FR)

(73) Assignee: Valeo Embrayages, Amiens Cedex 2 (FR)

(*) Notice: Subject to any disclaimer, the term of this patent is extended or adjusted under 35 U.S.C. 154(b) by 0 days.

(21) Appl. No.: 13/839,081

(22) Filed: Mar. 15, 2013

(65) Prior Publication Data
US 2013/0269475 A1   Oct. 17, 2013

Related U.S. Application Data

(62) Division of application No. 12/601,334, filed as application No. PCT/FR2008/000707 on May 22, 2008.

(30) Foreign Application Priority Data

May 22, 2007 (FR) ...................................... 07 55200

(51) Int. Cl.
*F16F 15/315* (2006.01)

(52) U.S. Cl.
USPC ........................................................ 475/347

(58) Field of Classification Search
USPC ............................................. 475/347; 74/574.4
See application file for complete search history.

(56) References Cited

U.S. PATENT DOCUMENTS

| | | | |
|---|---|---|---|
| 702,747 A * | 6/1902 | Saxon | ............................ 475/347 |
| 746,583 A | 12/1903 | Saxon | |
| 1,586,309 A | 5/1926 | Hult | |
| 2,027,666 A | 1/1936 | Bedford | |
| 2,247,839 A | 7/1941 | Halford | |
| 2,500,393 A | 3/1950 | Williams | |
| 2,735,310 A | 2/1956 | Mcfarland | |
| 2,868,037 A | 1/1959 | Hindmarch | |
| 2,868,040 A | 1/1959 | Chamberlin | |
| 3,165,943 A | 1/1965 | Sundt | |
| 3,529,494 A | 9/1970 | Matte | |
| 3,583,825 A | 6/1971 | Sadler et al. | |
| 4,503,719 A | 3/1985 | Hamano | |
| 4,532,828 A * | 8/1985 | LaGuardia | .................... 475/307 |
| 5,634,866 A | 6/1997 | Sudau | |
| 5,716,300 A | 2/1998 | Sammataro et al. | |
| 5,863,274 A | 1/1999 | Jackel | |
| 6,200,222 B1 | 3/2001 | Sudau | |
| 2003/0085086 A1 | 5/2003 | Oliver et al. | |
| 2008/0153656 A1 | 6/2008 | Nerstad et al. | |

FOREIGN PATENT DOCUMENTS

| | | |
|---|---|---|
| FR | 2592450 | 7/1987 |
| FR | 2701064 | 8/1994 |
| FR | 2714131 | 6/1995 |
| JP | 10288044 | 10/1998 |
| JP | 2000130508 | 5/2000 |
| SU | 1776897 | 11/1992 |

* cited by examiner

*Primary Examiner* — Sherry Estremsky
(74) *Attorney, Agent, or Firm* — Berenato & White, LLC

(57) ABSTRACT

Double shock-absorbing steering wheel, in particular for automobile vehicles, comprising a primary inertia mass connected to an engine shaft (12), a secondary inertia mass (14) connected by clutch E to a gearbox BV, and a torsion damper (18) rotatably connecting the two inertia masses (10, 14), this torsion damper including an epicycloidal gear train whose outer crown wheel (22) engages with a spring (28) for absorption of vibrations and rotation acyclisms, said spring being mounted around the crown wheel (22) in a fixed frame (26).

18 Claims, 4 Drawing Sheets

DOUBLE-FLYWHEEL DAMPER WITH EPICYCLIC GEAR TRAIN

CROSS-REFERENCE TO RELATED APPLICATIONS AND CLAIM TO PRIORITY

This application is a divisional of application Ser. No. 12/601,334 filed on Mar. 30, 2010 which is a national stage application of International Application No. PCT/FR2008/000707 filed on May 22, 2008, which claims priority to French patent application Ser. No. 07/55200 filed on May 22, 2007, of which the disclosures are incorporated herein by reference and to which priority is claimed.

BACKGROUND OF THE INVENTION

1. Field of the Invention

The invention concerns a double-flywheel damper, in particular for automobile vehicles, including two inertia masses mobile in rotation about the same axis and connected by a torsion damper including spring means and an epicyclic gear train.

2. Description of the Related Art

A double-flywheel damper of this type is known already, in particular from the document FR-A-2714131, which describes a double-flywheel damper in which the torsion damper includes an epicyclic gear train. In one embodiment described in the above prior art document, the sun gear is driven in rotation by a first inertia mass fastened to the crankshaft of an internal combustion engine, the outer crown wheel is fastened to the second inertia mass, and coil springs are mounted in a chamber delimited by the first inertia mass between that first inertia mass and the planet gear carrier, between the first inertia mass and the outer crown wheel or between the outer crown wheel and the planet gear carrier.

One advantage of using an epicyclic gear train in the torsion damper of a double-flywheel damper is the transmission of torque between the two inertia masses with a transmission ratio determined by the epicyclic gear train. However, the embodiments described in the document FR-A-2714131 have the drawback that the springs of the torsion damper, which are driven in rotation with the inertia masses and are situated at the external periphery of those inertia masses, are very sensitive to centrifugal forces and have a hysteresis that increases when the rotation speed increases, with risks of blocking and jerky operation.

SUMMARY OF THE INVENTION

One object of the present invention is to avoid these drawbacks of the prior art.

To this end it proposes a double-flywheel damper of the aforementioned type, including two inertia masses rotatable about the same axis and connected by a torsion damper including spring means and an epicyclic gear train consisting of three elements consisting of a sun gear, an outer crown wheel and a planet gear carrier the planet gears of which mesh with the sun gear and the outer crown wheel, characterized in that the spring means are disposed in a fixed chassis and associated with one of the three elements of the epicyclic gear train.

An essential advantage of the double shock-absorbing steering wheel of the invention is that the spring means of the torsion damper are not driven in rotation with the inertia masses and are therefore not subjected to centrifugal forces in operation.

In this double shock-absorbing steering wheel, the spring means bear on the one hand on the element of the epicyclic gear train and on the other hand on the fixed chassis, the rotation of that element relative to the fixed chassis being limited by the spring means.

In a preferred embodiment of the invention, the spring means comprise a coil spring that is mounted in the fixed chassis around said element and that at rest extends approximately 360° around the rotation axis of the inertia masses.

In this case, the angular range of movement of said element can reach 120° to either side of a rest position, the authorized angular range of movement between the two inertia masses being a function of the transmission ratio of the epicyclic gear train, for example 80° to either side of a rest position if the transmission ratio of the epicyclic gear train is 1.5, which represents a performance very much better than that of current double-flywheel dampers.

In another embodiment of the invention, the spring means of the torsion damper comprise a plurality of springs mounted end-to-end in the fixed chassis over an angle of approximately 360°.

The spring or springs of the torsion damper can be curved in their free state to facilitate mounting them in the fixed chassis.

According to another feature of the invention, this double-flywheel damper includes a pre-damper between the primary inertia mass and the element of the epicyclic gear train that is connected to the primary inertia mass.

This feature absorbs and damps vibrations and acyclic rotation when idling and at very low loads.

The double-flywheel damper of the invention can be mounted in the conventional way in an automobile vehicle between the internal combustion engine and a gearbox. It can also be wholly or partially included in the internal combustion engine, which has the advantage that the gears of the epicyclic gear train are lubricated by the engine lubricating oil.

Another advantage of the double-flywheel damper of the invention is that it eliminates the problem of passing through the resonant frequency on starting and stopping the engine by immobilizing the secondary inertia mass relative to the primary inertia mass, which can be done very simply by immobilizing the element of the epicyclic gear train on the fixed chassis.

Alternatively, it is possible to free the element of the epicyclic gear train completely relative to the fixed chassis so as in this way to separate totally the secondary inertia mass from the primary inertia mass and pass without difficulty through the resonant frequency on starting and stopping the engine.

BRIEF DESCRIPTION OF THE DRAWINGS

The invention will be better understood and other features, details and advantages of the invention will become more clearly apparent on reading the following description given with reference to the appended drawings in which.

DETAILED DESCRIPTION OF THE INVENTION

Figure 1:
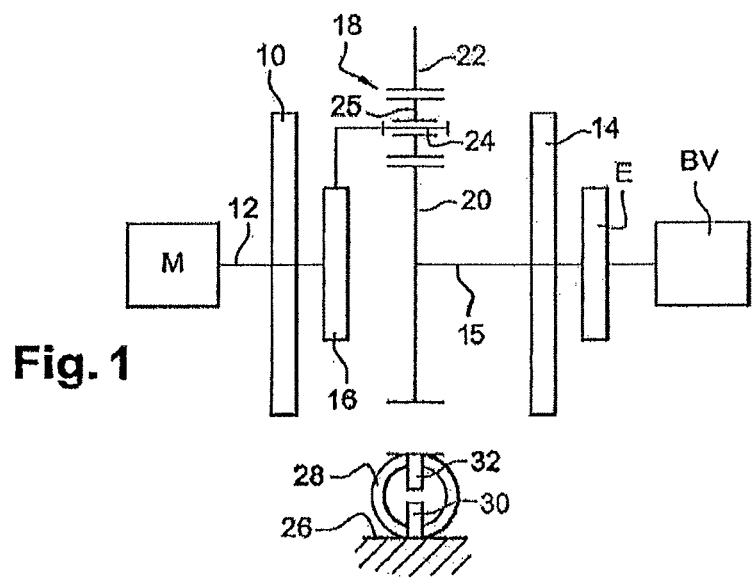
FIG. 1 is a simplified diagrammatic view of a double-flywheel damper of the invention.

The double-flywheel damper represented diagrammatically in FIG. 1 includes a primary inertia mass 10 (in the form of a primary flywheel) fixed to the end of a drive shaft 12, such as the crankshaft of an internal combustion engine M, and a secondary inertia mass 14 (in the form of a secondary flywheel) fixed to a driven shaft 15 and coaxial with the primary inertia mass 10. The secondary inertia mass 14 is, for example, connected by a clutch E to an input shaft of a gearbox BV. The two inertia masses (or flywheels) 10, 14 are connected together in rotation by a pre-damper 16 and by a torsion damper 18.

According to the invention, the torsion damper 18 includes an epicyclic gear train consisting of a sun wheel 20, an outer crown wheel 22 and a planet gear carrier 24 the planet gears 25 of which mesh with external teeth on the sun wheel 20 and internal teeth on the outer crown wheel 22.

In the embodiment of FIG. 1, the pre-damper 16, which is of a standard type, is mounted between the primary inertia mass 10 and the planet gear carrier 24. The driven shaft 15 of the sun wheel 20 is fastened to the secondary inertia mass 14, which can be centered and guided in rotation on the primary inertia mass 10 in the standard manner. The outer crown wheel 22 is guided in rotation in a fixed chassis 26 which surrounds the epicyclic gear train.

In this example, the torsion damper 18 also includes a coil spring 28 around the outer crown wheel of the epicyclic gear train that extends approximately 360° around the rotation axis of the double-flywheel damper, this spring 28 being housed and guided in an annular chamber of the fixed chassis 26, for example.

The ends of the spring 28 bear on the one hand on a radial lug 30 of the fixed chassis 26 and on the other hand on a radial lug 32 of the outer crown wheel 22, the radial lug 30 of the chassis 26 extending inward whereas the radial lug 32 of the outer crown wheel 22 extends outward.

In a known manner, the radial lug 32 of the outer crown wheel 22 can extend in a diametral plane of the end turns of the spring 28, whereas in this case the chassis 26 has two radial lugs 30 on respective opposite sides of the diametral lug 32 of the outer crown wheel 22, as is often the case in torsion dampers using circumferential springs.

The spring 28 of the torsion damper can be curved in the free state to facilitate fitting it around the outer crown wheel 22. Alternatively, it can be straight in the free state and bent into a curve in order to fit it around the outer crown wheel 22.

In another variant, the spring 28 can be replaced by two or more springs mounted end-to-end, these springs being curved or straight in the free state.

Figure 2:
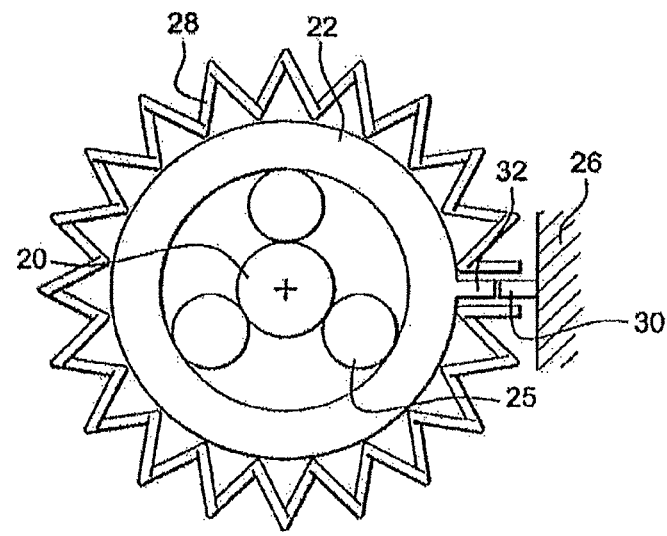
FIG. 2 is a front view of the torsion damper of this double-flywheel damper in a rest position.

The double-flywheel damper that has just been described operates in the following manner:

When idling and at low loads, vibrations and acyclic rotation are absorbed and damped by the pre-damper 16, whereas the spring 28 of the torsion damper 18 remains in the state represented in FIG. 2, where it extends approximately 360° around the outer crown wheel 22, its two ends bearing on the radial lug 30 of the fixed chassis and on the radial lug 32 of the outer crown wheel 22.

Figure 3:
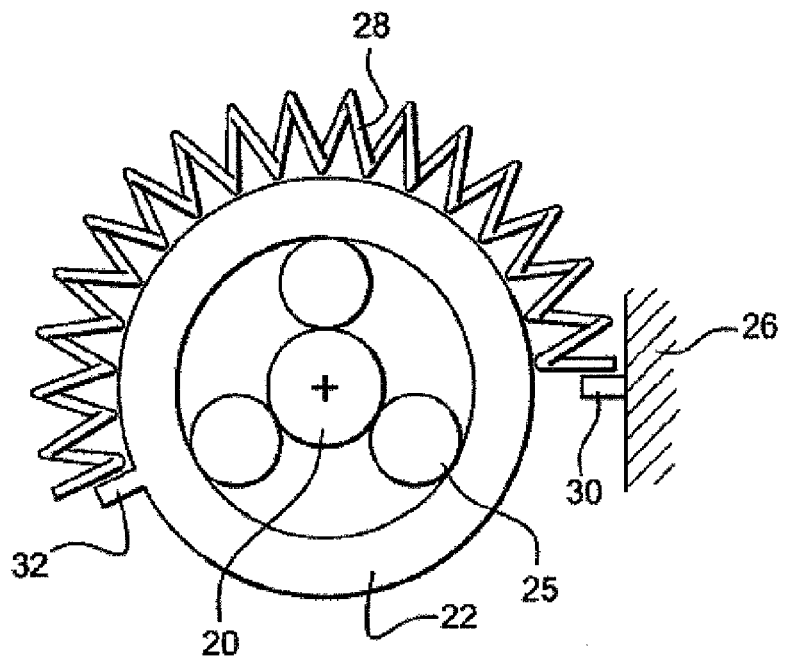
FIGS. 3 and 4 are views similar to FIG. 2 representing the torsion damper in two different operating positions.
Figure 4:
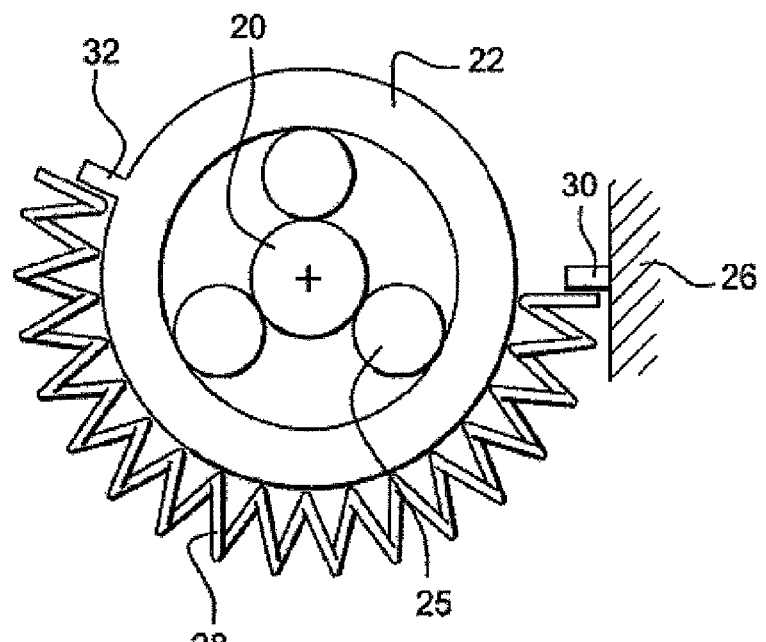

When the torque transmitted by the double-flywheel damper increases, vibration and acyclic rotation transmitted by the drive shaft 12 to the primary inertia mass 10 are absorbed by the spring 28, which is compressed either in the forward direction as represented in FIG. 3 or in the opposite direction as represented in FIG. 4, the vibrations and acyclic rotations being damped by friction means mounted in the standard manner in the torsion damper 18 between the two inertia masses, these friction means being well known to the person skilled in the art and not being represented in the drawings for reasons of clarity.

In FIGS. 3 and 4, the spring 28 is in a maximally compressed state, its turns being contiguous or substantially contiguous.

In this state, the rotation of the outer crown wheel 22 relative to the fixed chassis 26 is approximately 120°, for example. The corresponding rotation of the secondary inertia mass relative to the primary inertia mass is determined by the transmission ratio of the epicyclic gear train. If this ratio is 1.5, for example (which means that the rotation speed of the secondary inertia mass 14 is 1.5 times the rotation speed of the primary inertia mass 10), the maximum possible angular range of movement of the secondary inertia mass 14 relative to the primary inertia mass 10 is 80° to either side of a median position if the angular range of movement of the outer crown wheel 22 relative to the fixed chassis is 120° to either side of a median position. The resulting vibration damping performance is very much better than that of a standard double-flywheel damper.

Passage through the resonant frequency, which is a problem encountered in all double-flywheel dampers when stopping and starting the engine of the vehicle, can be solved very simply in the double-flywheel damper of the invention, either by preventing rotation of the outer crown wheel 22 or by releasing the outer crown wheel, the secondary inertia mass being then either prevented from rotating relative to the primary inertia mass or free to rotate relative to that primary inertia mass on passing through the resonant frequency.

The outer crown wheel 22 can be immobilized by immobilizing its radial lug 32 or by application of a brake shoe to the outer crown wheel. Releasing it so that it can rotate is simply achieved by retracting the radial lug 30 of the fixed chassis on passing through the resonant frequency.

When the double-flywheel damper of the invention is mounted in the standard way in an automobile vehicle between the engine and the gearbox, the epicyclic gear train of the torsion damper must be accommodated in a sealed chamber containing a lubricating liquid.

If the double-flywheel damper of the invention is included fully or at least partially in the internal combustion engine of the vehicle, the sealed chamber is no longer necessary and the components of the epicyclic gear train are lubricated directly by the engine oil.

An electro-rheological or magneto-rheological fluid can also be used as an energy dissipating element in the double-flywheel damper of the invention, these fluids consisting of suspensions of solid particles the mechanical properties of which can be adjusted by an external electric or magnetic field.

Figure 5:
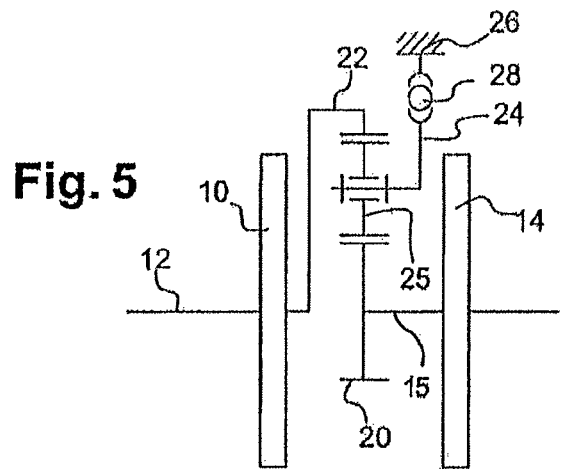
FIGS. 5 to 9 represent variants of the invention.

In the FIG. 5 variant, the primary inertia mass 10 is constrained to rotate with the outer crown wheel 22 and the planet gear carrier 24 is retained by the spring means 28 housed in a chamber of a fixed element 26.

This embodiment differs from that of FIG. 1 in that the connections of the primary mass 10 and the chassis to the planet gear carrier and to the outer crown wheel are reversed, the secondary inertia mass 14 remaining connected to the sun wheel 20.

Figure 6:
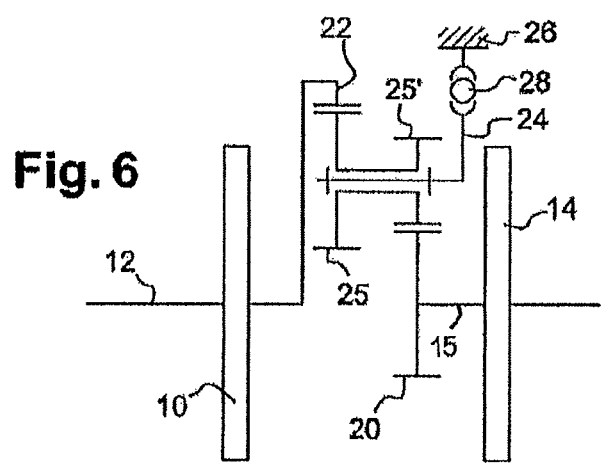

FIG. 6 shows the FIG. 5 embodiment to which has been added a second stage of planet gears 25'. The planet gears 25 of the first stage mesh with the outer crown wheel 22 and the planet gears 25' mesh with the sun wheel 20, the planet gears 25 and 25' being mounted on the same support 24.

These two stages of planet gears offer greater freedom in the choice of the transmission ratio of the epicyclic gear train for a small overall size in the radial direction. The input and output rotation directions of the epicyclic gear train are reversed.

Figure 7:
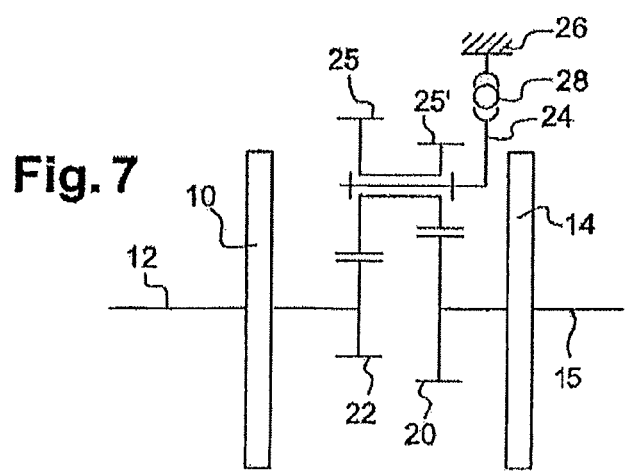

FIG. 7 shows the device from FIG. 6 with a modification of the contacts of the outer crown wheel 22 and the planet gears 25 from the outside to the inside of the planet gears. This arrangement has the advantage that the input and output rotation directions of the epicyclic gear train are the same.

Figure 8:
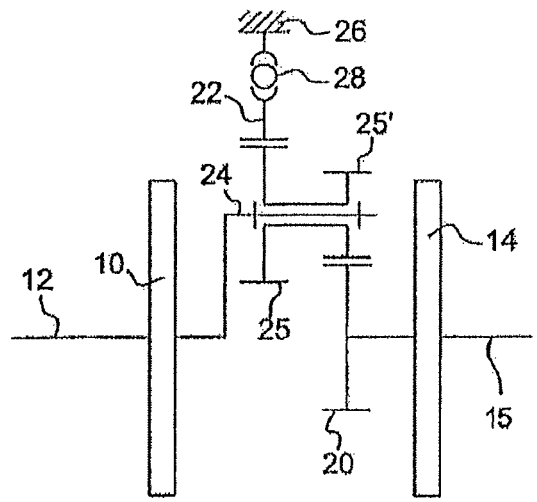

The device represented in FIG. 8 is that from FIG. 1 with the addition of a second stage of planet gears 25' as in FIG. 6. The input and output rotation directions of the gear train are identical. There is a wider choice of transmission ratios of the gear train for a small overall size in the radial direction.

Figure 9:
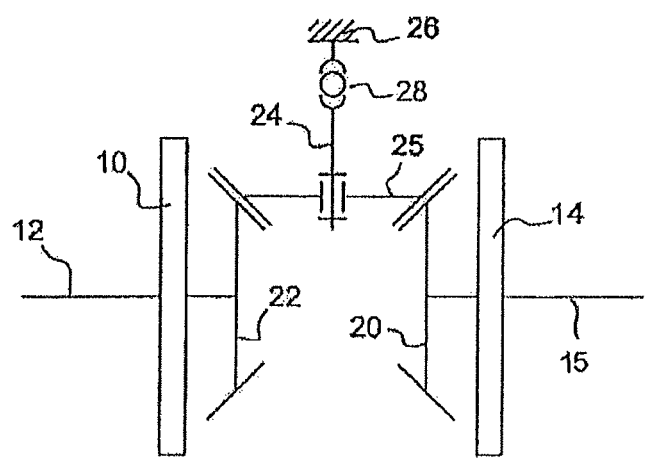

The FIG. 9 variant features the arrangement of the epicyclic gear train of the type used in a gearbox differential, that includes two coaxial sun wheels 20 and 22, and a planet gear carrier 24 having planet gears 25 meshing with both of the sun wheels 20 and 22. Specifically, as illustrated in FIG. 9, the planet gears 25 are in the form of 45° bevel gears of the type used in a gearbox differential. The transmission ratio of the gear train is equal to 1, the input and output rotation directions are reversed, and the overall size is minimal.

In all the embodiments represented in the drawings, the inertia masses are interchangeable, i.e. the primary inertia mass 10 can be connected to the sun wheel 20 and the secondary inertia mass 14 can be connected to the outer crown wheel 22 or to the planet gear carrier 24.

The invention claimed is:

1. A double-flywheel damper, comprising:
   two flywheels rotatable about the same axis and connected by a torsion damper;
   the torsion damper including at least one spring and an epicyclic gear train;
   the epicyclic gear train including two coaxial sun wheels and a planet gear carrier having planet gears meshing with both of the sun wheels;
   the at least one spring disposed in a fixed chassis and associated with a first element of the epicyclic gear train;
   the first element of the epicyclic gear train being the planet gear carrier;
   the planet gears of the epicyclic gear train being 45° bevel gears.

2. The double-flywheel damper according to claim 1, wherein the spring bears on the first element and on the fixed chassis.

3. The double-flywheel damper according to claim 1, wherein the rotation of the first element relative to the fixed chassis is limited by the spring.

4. The double-flywheel damper according to claim 1, wherein the first element includes a radial lug on which the spring bears.

5. The double-flywheel damper according to claim 1, wherein the spring is a coil spring mounted in the fixed chassis around the first element.

6. The double-flywheel damper according to claim 5, wherein at rest the coil spring extends over approximately 360° in the fixed chassis.

7. The double-flywheel damper according to claim 1, wherein the spring comprises a plurality of springs mounted end-to-end in the fixed chassis.

8. The double-flywheel damper according to claim 1, further including means for immobilizing or allowing free rotation of the first element of the epicyclic gear train on passing through a resonant frequency.

9. The double-flywheel damper according to claim 1, wherein the torsion damper further includes energy dissipation element consisting of an electro-rheological or magneto-rheological fluid.

10. A double-flywheel damper, comprising:
    two flywheels rotatable about the same axis and connected by a torsion damper;
    the torsion damper including at least one spring and an epicyclic gear train;
    the epicyclic gear train including two coaxial sun wheels and a planet gear carrier having planet gears meshing with both of the sun wheels;
    the at least one spring disposed in a fixed chassis and associated with a first element of the epicyclic gear train;
    the first element of the epicyclic gear train being the planet gear carrier.

11. The double-flywheel damper according to claim 10, wherein the spring bears on the first element and on the fixed chassis.

12. The double-flywheel damper according to claim 10, wherein the rotation of the first element relative to the fixed chassis is limited by the spring.

13. The double-flywheel damper according to claim 10, wherein the first element includes a radial lug on which the spring bears.

14. The double-flywheel damper according to claim 10, wherein the spring is a coil spring mounted in the fixed chassis around the first element.

15. The double-flywheel damper according to claim 14, wherein at rest the coil spring extends over approximately 360° in the fixed chassis.

16. The double-flywheel damper according to claim 10, wherein the spring comprises a plurality of springs mounted end-to-end in the fixed chassis.

17. The double-flywheel damper according to claim 10, further including means for immobilizing or allowing free rotation of the first element of the epicyclic gear train on passing through a resonant frequency.

18. The double-flywheel damper according to claim 10, wherein the torsion damper further includes energy dissipation element consisting of an electro-rheological or magneto-rheological fluid.

* * * * *